3,560,562
INSECTICIDAL OXIMES
Raymond Giraudon, Thiais, Val-de-Marne, France, assignor to Rhone-Poulenc S.A., Paris, France, a French body corporate
No Drawing. Filed Aug. 15, 1968, Ser. No. 752,804
Claims priority, application France, Aug. 16, 1967, 117,982; May 27, 1968, 153,067
Int. Cl. C07c 131/00
U.S. Cl. 260—566    6 Claims

ABSTRACT OF THE DISCLOSURE

The oximes of the formula:

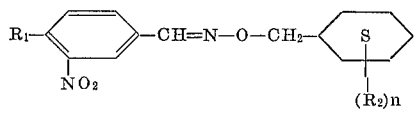

where $R_1$ is hydrogen or lower alkyl and $n$ is an integer of 0–4 wherein each $R_2$ independently represents alkyl of 1–4 carbon atoms, which are new, are valuable insecticides having low toxicity to warm-blooded animals.

---

This invention relates to oximes, their preparation, and compositions containing them.

The invention provides the oximes of the formula:

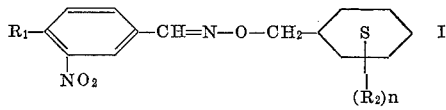

in which $R_1$ represents a hydrogen atom or an alkyl radical containing 1 to 3 carbon atoms and $n$ is an integer of 0–4 wherein each $R_2$ independently represents alkyl of 1–4 carbon atoms. The compounds of Formula I may exist in stereoisomeric forms and the invention comprises both these different forms and their mixtures.

According to the invention, oximes of Formula I are prepared by reacting an oxime of the formula:

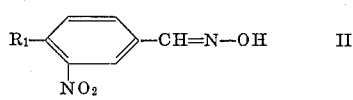

in which $R_1$ is defined as above, or of its alkali metal, e.g. sodium or potassium, salt, which may be prepared in situ, with a reactive ester of the formula:

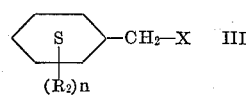

in which $n$ and $R_2$ are defined as above and X represents a reactive ester residue, such as a halogen atom or a sulphonic ester residue. The reaction is conveniently effected in an organic solvent such as an alcohol (ethanol), a nitrile (acetonitrile) or an amide (dimethylformamide), optionally in the presence of a condensing agent such as an alkali metal alkoxide at a temperature between ambient temperature (20° C.) and the boiling point of the reaction mixture.

The compounds of Formula II may be obtained by the usual methods of preparation of oximes from the corresponding aldehydes.

The compounds of Formula III may be obtained from the alcohols of the formula:

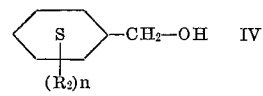

in which $n$ and $R_2$ are defined as above, by usual esterification methods.

The alcohols of Formula IV may be obtained from the benzoic acids or esters of general formula:

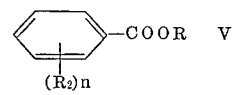

in which $n$ and $R_2$ are defined as above and R represents a hydrogen atom or an alkyl radical containing 1 to 4 carbon atoms, by the usual methods of reducing acids and esters to alcohols and benzene to cyclohexane, and particularly by the method of Darling et al., J. Chem. Soc., pp. 1364–8 (1953) for the preparation of 3-methyl-cyclohexane-methanol.

The compounds of Formula I have remarkable insecticidal properties, especially against *Musca domestica* and *Tribolium*, and acaricidal properties, especially against *Tetranychus urticae*, with a marked ovicidal activity. Furthermore the compounds of Formula I show very low toxicity towards human beings and warm-blooded animals. Compounds of special interest are O-(3-t.butyl-cyclohexylmethyl) - 3 - nitro - benzaldoxime, O - (3-methyl - 5 - t.butyl - cyclohexylmethyl)-3-nitro-benzaldoxime, O - (3,3,5,5 - tetramethyl-cyclohexylmethyl)-3-nitro-benzaldoximer, O-(3,5-dimethyl-cyclohexylmethyl)-3 - nitro - benzaldoxime, and O-(3,3,5,5-trimethyl-cyclohexylmethyl)-3-nitro-benzaldoxime.

The present invention also provides pesticidal compositions containing at least one compound of Formula I, in association with at least one diluent compatible with the active product or products and suitable for use in agriculture. Depending on whether the composition is a concentrate or ready to use, it may contain from 80% to 0.001% by weight of active material.

The compositions may be solid, if a solid pulverulent compatible diluent such as talc, calcined magnesia, kieselguhr, tricalcium phosphate, cork powder, adsorbent charcoal or a clay such as kaoline or bentonite is used. These solid compositions are advantageously prepared by grinding the active compound with the solid diluent or by impregnating the solid diluent with a solution of the active compound in a volatile solvent, evaporating the solvent and, if necessary, grinding the product to a powder.

Liquid compositions may be obtained by using a liquid diluent in which the compound or compounds of the invention are dissolved or dispersed. The composition may be in the form of a suspension, emulsion or solution in an organic or aqueous-organic medium. Compositions in the form of dispersions, solutions or emulsions may contain wetting agents, dispersing agents or emulsifiers of the ionic or non-ionic type, for example sulphoricinoleates, quaternary ammonium salts or products based on ethylene oxide condensates, such as the condensates of ethylene oxide with octylphenol or with esters of fatty acids and anhydrosorbitols. It is preferable to use agents of the non-ionic type because they are not sensitive to electrolytes.

If emulsions are desired, the compounds of the invention may be used in the form of self-emulsifying concentrates by the method described in Example 2 starting from suitable materials:

| Example No.: | $R_1$ | $R_2$ | Boiling point in ° C. (or melting point) |
|---|---|---|---|
| 3 | H | cis plus trans 2-$(CH_3)$ | B.P.=155–160°/0.1 mm. Hg. |
| 4 | H | trans 4-$(CH_3)$ | B.P.=183–186°/0.1 mm. Hg, M.P.=46–50°. |
| 5 | $CH_3$ | trans 4-$(CH_3)$ | B.P.=163–166°/0.1 mm. Hg, M.P.=45–48°. |
| 6 | H | cis 4-$(CH_3)$ | B.P.=161–165°/0.1 mm. Hg. |
| 7 | $CH_3$ | cis 4-$(CH_3)$ | B.P.=166–170°/0.1 mm. Hg. |
| 8 | H | 3-$(CH_3)$ 4-$(CH_3)$ | B.P.=180–185°/0.2 mm. Hg. |
| 9 | H | cis 3-$(CH_3)$ | B.P.=142–145°/0.05 mm. Hg. |
| 10 | H | 3-$(CH_3)$ 5-$(CH_3)$ | B.P.=166–180°/0.1 mm. Hg. |
| 11 | H | cis plus trans 3-$(C_2H_5)$ | B.P.=160–168°/0.1 mm. Hg. |
| 12 | H | 3-$(CH_3)$3-$(CH_3)$5-$(CH_3)$ | B.P.=186–188°/0.2 mm. Hg. |
| 13 | H | cis plus trans 3-$[C(CH_3)_3]$ | B.P.=163–168°/0.1 mm. Hg. |
| 14 | H | 3-$(CH_3)$ 3-$(CH_3)$ 5-$(CH_3)$5-$(CH_3)$ | B.P.=186°/0.4 mm. Hg. |
| 15 | H | 3-$(CH_3)$ 5-$[C(CH_3)_3]$ | Yellow viscous oil. |
| 16 | H | 2-$(CH_3)$4-$(CH_3)$5-$(CH_3)$ | B.P.=170–175°/0.2 mm. Hg. |
| 17 | $CH_3$ | 2-$(CH_3)$4-$(CH_3)$5-$(CH_3)$ | B.P.=185–189°/0.2 mm. Hg. |
| 18 | $CH_3$ | cis plus trans 3-$[C(CH_3)_3]$ | B.P.=175–178°/0.2 mm. Hg. |
| 19 | H | 3-$(CH_3)$3-$(CH_3)$ | Yellow oil. | containing the active substance dissolved in the dispersing agent or in a solvent which is compatible with the said agent, simple addition of water making it possible to obtain compositions ready for use.

The compounds of Formula I are preferably used at the rate of 5 to 150 g. of active material per hectolitre of water but lower concentrations may also be used.

The following examples illustrate the invention.

EXAMPLE 1

20 cc. of a 2.25 N solution of potassium ethoxide in ethanol are added to a suspension of 7.5 g. of 3-nitrobenzaldoxime in 30 cc. of ethanol. 7.9 g. of cyclohexylmethyl bromide are then added dropwise in about 2 minutes. The mixture is heated for 1 hour under reflux. After cooling, the precipitate of potassium bromide is filtered off, and the solvent is evaporated. The residual oil (15 g.) is taken up in 100 cc. of methylene chloride. The resulting solution is washed first with 50 cc. of N aqueous sodium hydroxide solution and then twice with 50 cc. of water, and dried over anhydrous sodium sulphate in the presence of decolorising charcoal. After filtration and evaporation of the solvent, the resulting oil (9 g.) is distilled under reduced pressure. 7 g. of O-cyclohexylmethyl-3-nitrobenzaldoxime, B.P. 155–160° C./0.2 mm. Hg, M.P. 56° C. (Kofler bench) are obtained.

Cyclohexylmethyl bromide (P.B. 84–85.5° C./30 mm. Hg) is prepared by the process of Hiers et al., J. Amer. Chem. Soc. 48, 2389 (1926).

EXAMPLE 2

20.1 g. of 3-methylsulphonyloxymethyl-1-methyl-cyclohexane are added to a suspension of 20 g. of the potassium salt of 3-nitrobenzaldoxime in 200 cc. of dimethylformamide. The mixture is heated for 2 hours at 55° C. The greater part of the solvent is then evaporated under reduced pressure. The residue is taken up in a mixture of 250 cc. of methylene chloride and 100 cc. of N aqueous sodium hydroxide solution. The methylene chloride solution is separated, washed successively with 100 cc. of N aqueous sodium hydroxide solution and with 250 cc. of water, and dried over anhydrous sodium sulphate in the presence of decolorising charcoal. After filtration and evaporation of the solvent, the residual oil is distilled under reduced pressure. 19 g. of O-(3-methyl-cyclohexylmethyl)-3-nitrobenzaldoxime, B.P. 165–167° C./0.1 mm. Hg, are obtained.

The 3 - methylsulphonyloxymethyl-1-methyl-cyclohexane (B.P. 101–111° C./0.1 mm. Hg) was prepared by reaction of methanesulphonyl chloride with 3-methyl-cyclohexylmethanol in methylene chloride in the presence of anhydrous triethylamine. The 3-methyl-cyclohexylmethanol starting material (B.P. 99–100° C./23 mm. Hg) is prepared by the process of Darling et al., J. Chem. Soc. 1364–8 (1953).

EXAMPLES 3 TO 19

The following compounds of Formula I are prepared by the method described in Example 2 starting from suitable materials:

EXAMPLE 20

5 g. of a condensation product of octylphenol and ethylene oxide containing 10 molecules of ethylene oxide per molecule of octylphenol are added to 20 g. of O-(3-t.butyl - cyclohexylmethyl) - 3 - nitrobenzaldoxime, and a mixture of equal volumes of toluene and acetophenone is added until the total volume is 100 cc. The solution is, after suitable dilution with water, used to destroy mites. Concentrations of 5 to 100 g. of active material per hectolitre, depending on the desired effect, give good results.

EXAMPLE 21

400 g. of kaolin, 100 g. of ground gum arabic and 100 g. of calcium lignosulphite are added to 400 g. of O-(3-t.butyl-cyclohexylmethyl) - 3 - nitrobenzaldoxime. After grinding and sieving, the resulting powder is used to protect plants against the attacks of mites, using it after dilution with water at the rate of 250 g. of power per 100 litres of water.

The acaricidal activity of the compounds of Formula I was demonstrated in the following test. French bean plants are soaked for 10 seconds in an emulsion of the compound under test. When they are dry, they are infested with red spiders. Mortalities are assessed after 4 days.

Emulsifiable concentrates are prepared having the following composition

Active compound—1 g.
Polyethylene glycol oleate—0.2 cc.
Condensation product of one molecule of octylphenol with 10 molecules of ethylene oxide—0.2 cc.
o-Dichlorobenzene—1 cc.
Acetophenone to make—5 cc.

Aqueous emulsions containing 0.1%, 0.05%, 0.02% and 0.01% of the active compound are prepared from these concentrates by dilution with water.

The results obtained are given in the table below.

TABLE

| | Percent mortality | | | |
|---|---|---|---|---|
| Product of Example No. | 0.01% emulsion | 0.02% emulsion | 0.05% emulsion | 0.1% emulsion |
| 1 | | | 80 | 100 |
| 2 | | 70 | 100 | |
| 3 | | 40 | 90 | 100 |
| 4 | | 30 | 90 | 100 |
| 5 | | | 10 | 25 |
| 6 | | 20 | 80 | 100 |
| 7 | | | | 20 |
| 8 | | 80 | 95 | 100 |
| 9 | | 80 | 100 | 100 |
| 10 | 30 | 90 | 100 | 100 |
| 11 | | 70 | 100 | 100 |
| 12 | 20 | 90 | 100 | 100 |
| 13 | 100 | 100 | 100 | |
| 14 | 100 | 100 | 100 | |
| 15 | 100 | 100 | 100 | |
| 16 | | | 80 | 100 |
| 17 | | 40 | 80 | 100 |
| 18 | | 50 | 95 | 95 |
| 19 | | | 70 | 100 |

I claim:
1. An oxime of the formula:

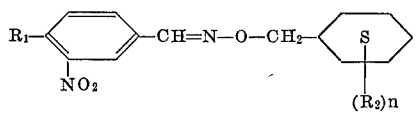

in which $R_1$ represents hydrogen or alkyl of 1 to 3 carbon atoms and $n$ is an integer of 0–4 wherein each $R_2$ independently represents alkyl of 1–4 carbon atoms.

2. An oxime according to claim 1 which is O-(3-t.butyl-cyclohexylmethyl)-3-nitro-benzaldoxime.

3. An oxime according to claim 1 which is O-(3-methyl-5-t.butyl-cyclohexylmethyl)-3-nitro-benzaldoxime.

4. An oxime according to claim 1 which is O-(3,3,5,5-tetramethyl-cyclohexylmethyl)-3-nitro-benzaldoxime.

5. An oxime according to claim 1 which is O-(3,5-dimethyl-cyclohexylmethyl)-3-nitro-benzaldoxime.

6. An oxime according to claim 1 which is O-(3,3,5-trimethyl-cyclohexylmethyl)-3-nitro-benzaldoxime.

References Cited

Beilsteins Handbuch der Organischen Chemie, vol. 7, p. 903 (1968).

BERNARD HELFIN, Primary Examiner

G. A. SCHWARTZ, Assistant Examiner

U.S. Cl. X.R.

424—327